US009003071B2

(12) United States Patent
Liu

(10) Patent No.: US 9,003,071 B2
(45) Date of Patent: Apr. 7, 2015

(54) NAMESPACE ACCESS CONTROL IN NVM EXPRESS PCIE NVM WITH SR-IOV

(71) Applicant: Futurewei Technologies, Inc., Plano, TX (US)

(72) Inventor: Jinshui Liu, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 136 days.

(21) Appl. No.: 13/900,037

(22) Filed: May 22, 2013

(65) Prior Publication Data

US 2014/0281040 A1    Sep. 18, 2014

Related U.S. Application Data

(60) Provisional application No. 61/780,869, filed on Mar. 13, 2013.

(51) Int. Cl.
*G06F 12/00* (2006.01)
*G06F 9/50* (2006.01)
*G06F 13/00* (2006.01)

(52) U.S. Cl.
CPC .......................................... *G06F 9/50* (2013.01)

(58) Field of Classification Search
CPC .................................. G06F 12/00; G06F 13/00
USPC ........................................................ 710/3, 8–9
See application file for complete search history.

(56) References Cited

U.S. PATENT DOCUMENTS

| 7,913,024 | B2 * | 3/2011 | Brown et al. | 710/313 |
|---|---|---|---|---|
| 7,984,452 | B2 * | 7/2011 | Chakravarty et al. | 719/318 |
| 8,302,110 | B2 * | 10/2012 | Koike | 719/324 |
| 8,434,155 | B2 * | 4/2013 | Sahita et al. | 726/27 |
| 8,645,605 | B2 * | 2/2014 | Subramaniyan et al. | 710/313 |
| 8,739,156 | B2 * | 5/2014 | Frank | 718/1 |
| 8,825,981 | B2 * | 9/2014 | Brownlow et al. | 711/173 |
| 2008/0148032 | A1 * | 6/2008 | Freimuth et al. | 713/1 |
| 2008/0294825 | A1 * | 11/2008 | Mahalingam et al. | 710/262 |
| 2010/0146170 | A1 * | 6/2010 | Brown et al. | 710/105 |
| 2011/0252263 | A1 * | 10/2011 | Cho | 713/400 |
| 2011/0283037 | A1 * | 11/2011 | Koga et al. | 710/313 |
| 2013/0080732 | A1 * | 3/2013 | Nellans et al. | 711/206 |
| 2013/0159572 | A1 * | 6/2013 | Graham et al. | 710/104 |
| 2014/0025877 | A1 * | 1/2014 | Talagala et al. | 711/103 |
| 2014/0102491 | A1 * | 4/2014 | Bhajak et al. | 134/164 |
| 2014/0201419 | A1 * | 7/2014 | Ayzenfeld et al. | 710/313 |

OTHER PUBLICATIONS

"Single Root I/O Virtualization and Sharing Specification," Revision 1.1, Jan. 20, 2010, pp. 1-90.
"NVM Express," Revision 1.1, Oct. 11, 2012, pp. 1-163.

* cited by examiner

*Primary Examiner* — Christopher Shin
(74) *Attorney, Agent, or Firm* — Conley Rose, P.C.; Grant Rodolph; William H. Dietrich

(57) ABSTRACT

A method implemented by a non-volatile memory (NVM) controller comprising obtaining a NVM express (NVMe) command comprising a namespace identifier (NSID) from a host memory via a peripheral component interconnect express (PCIe) function, determining a mapping between the PCIe function and a namespace identified by the NSID based on a data structure stored in a PCIe memory address space, and accessing the namespace based on the mapping between the PCIe function and the namespace.

20 Claims, 9 Drawing Sheets

| Bytes | Description |
|---|---|
| 63:60 | Command Dword 15 (CDW15): This field is command specific Dword 15. |
| 59:56 | Command Dword 14 (CDW14): This field is command specific Dword 14. |
| 55:52 | Command Dword 13 (CDW13): This field is command specific Dword 13. |
| 51:48 | Command Dword 12 (CDW12): This field is command specific Dword 12. |
| 47:44 | Command Dword 11 (CDW11): This field is command specific Dword 11. |
| 43:40 | Command Dword 10 (CDW10): This field is command specific Dword 10. |
| 39:32 | PRP Entry 2 (PRP2): This field contains the second PRP entry for the command or if the data transfer spans more than two memory pages, then this field is a PRP List pointer. |
| 31:24 | PRP Entry 1 (PRP1): This field contains the first PRP entry for the command or a PRP List pointer depending on the command. |
| 23:16 | Metadata Pointer (MPTR): This field contains the address of a contiguous physical buffer of metadata. This field is only used if metadata is not interleaved with the logical block data, as specified in the Format NVM command. This field shall be Dword aligned. |
| 15:08 | Reserved |
| 07:04 | Namespace Identifier (NSID): This field specifies the namespace ID that this command applies to. If the namespace ID is not used for the command, then this field shall be cleared to 0h. If a command shall be applied to all namespaces on the device, then this field shall be set to FFFFFFFFh. Unless otherwise noted, specifying an inactive namespace ID in a command that uses the namespace ID shall cause the controller to abort the command with status invalid Field in Command. Specifying an invalid namespace ID in a command that uses the namespace ID shall cause the controller to abort the command with status invalid Namespace or Format. |
| 03:00 | Command Dword 0 (CDW0): This field is common to all commands and is defined in Figure 10. |

*FIG. 5*

| Bytes | Description |
|---|---|
| 63:60 | Command Dword 15 (CDW15): This field is command specific Dword 15. |
| 59:56 | Command Dword 14 (CDW14): This field is command specific Dword 14. |
| 55:52 | Command Dword 13 (CDW13): This field is command specific Dword 13. |
| 51:48 | Command Dword 12 (CDW12): This field is command specific Dword 12. |
| 47:44 | Command Dword 11 (CDW11): This field is command specific Dword 11. |
| 43:40 | Command Dword 10 (CDW10): This field is command specific Dword 10. |
| 39:24 | If CDW0[15] is cleared to '0'. then the definition of this field is:<br><br>39:32 — PRP Entry 2 (PRP2): This field contains the second PRP entry for the command or if the data transfer spans more than two memory pages, then this field is a PRP List pointer.<br><br>31:24 — PRP Entry 1 (PRP 1): This field contains the first PRP entry for the command or a PRP List pointer depending on the command.<br><br>If CDW0[15] is set to '1'. then the definition of this field is:<br><br>39:24 — SGL Entry 1 (SGL1): This field contains the first SGL segment for the command. If the SGL segment is a Data Block descriptor, then it describes the entire data transfer. If more than one SGL segment is needed to describe the data transfer, then the first SGL segment is a Segment, or Last Segment descriptor. Refer to section 4.4 for the definition of SGL segments and description types. |
| 23:16 | If CDW0[15] is cleared to '0'. then the definition of this field is:<br><br>23:16 — Metadata Pointer (MPTR): This field contains the address of a contiguous physical buffer of metadata. This field is only used if metadata is not interleaved with the logical block data, as specified in the Format NVM command. This field shall be Qword aligned. Refer to section 4.4.<br><br>If CDW0[15] is set to '1'. then the definition of this field is:<br><br>23:16 — Metadata SGL Segment Pointer (MSGLP): This field contains the address of an SGL segment which describes the metadata to transfer. This field is only used if metadata is not interleaved with the logical block data, as specified in the Format NVM command. This field shall be Qword aligned. Refer to section 4.4. |
| 15:08 | Reserved |
| 07:04 | Namespace Identifier (NSID): This field specifies the namespace that this command applies to. If the namespace is not used for the command, then this field shall be cleared to 0h. If a command shall be applied to all namespaces on the device, then this value shall be set to FFFFFFFFh. |
| 03:00 | Command Dword 0 (CDW0): This field is common to all commands and is defined in Figure 10. |

NAMESPACE ACCESS CONTROL IN NVM EXPRESS PCIE NVM WITH SR-IOV

CROSS-REFERENCE TO RELATED APPLICATIONS

The present application claims priority to U.S. Provisional Patent Application No. 61/780,869 filed Mar. 13, 2013 by Jinshui Liu and entitled "Methods and Architectures for Virtual Machine Data Access Control in NVM Express PCIe NVM with SR-IOV", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A virtual machine (VM) may be considered a simulation or software implementation of a physical machine (e.g., a computer) that executes programs like the physical machine. A computer system (e.g., a server) may often be configured to have multiple VMs, which may be managed by a virtual machine manager (VMM). The VMM, sometimes referred to as a hypervisor, has a supervisory role, such as assigning hardware resources to the VMs and relaying data traffic between the VMs and input/output (I/O) devices. Due to the increasing throughput of I/O devices, if all traffic goes through the VMM, the speed of the VMM may become a performance bottleneck. For example, a peripheral component interconnect express non-volatile memory (PCIe-NVM) device may now provide a throughput of more than 5 Gigabytes per second (GB/s). If a plurality of this type of I/O devices communicate with multiple VMs through a single VMM, the throughput of storage traffic may likely be limited by the VMM.

To cope with this challenge, server virtualization techniques such as single root I/O virtualization (SR-IOV) have been proposed and are being adopted in designing networking and/or storage controllers, such as network interface controller (NIC), converged network adapter (CNA), host bus adapter (HBA), and redundant array of independent disks (RAID) controller. SR-IOV may allow each VM to have direct access to hardware, such as NIC/CNA/HBA, in the form of a virtual function (VF). Thus, network and/or storage traffic may bypass the VMM and communicate between the memory of a VM and the NIC/CNA/HBA hardware directly. Bypassing the VMM may avoid memory copying between VMs and the VMM, thereby improving network throughput and lowering access latency. In today's storage devices, SR-IOV may only be supported when an internet small computer system interface (iSCSI) or fiber channel (FC) protocols are used.

NVM express (NVMe) may be considered a specification that defines a register interface for communicating with a PCIe-NVM subsystem. The specification also defines a standard command set for use with the PCIe-NVM subsystem. As of today, there may be no VMM supporting NVMe in SR-IOV mode, but it is anticipated that this may change soon as PCIe-NVM devices are being rapidly deployed in enterprise servers, e.g., due to their performance advantages over hard disk drives (HDDs). For example, random access performance of a PCIe-NVM may be up to 1000 times better than a HDD, and power consumption of the PCIe-NVM per input/output operations per second (IOPS) may be relatively lower.

However, before SR-IOV can be fully supported by NVMe PCIe-NVM devices, a few issues need to be addressed first. For example, there needs to be a mechanism for allocating NVMe PCIe-NVM resources (e.g., storage capacity) to each of the VMs. For another example, there needs to be a mechanism to isolate data and/or resources among VMs, so that a given VM may only be able to access data and/or resources assigned to itself, and not data or resources assigned to another VM.

SUMMARY

In one embodiment, the disclosure includes a method implemented by a non-volatile memory (NVM) controller comprising getting a NVM express (NVMe) command comprising a namespace identifier (NSID) via a peripheral component interconnect express (PCIe) function, determining a mapping between the PCIe function and a namespace identified by the NSID based on a data structure stored in a memory address space, and accessing the namespace based on the mapping between the PCIe function and the namespace.

In another embodiment, the disclosure includes an apparatus comprising one or more NVM devices having a total storage capacity represented by a plurality of namespaces, a NVMe PCIe-NVM controller coupled to the NVM devices, and a plurality of PCIe functions including a physical function (PF) and a number of virtual functions (VF) coupled to the NVM controller, wherein the NVM controller is configured to get a NVMe command comprising a NSID via one of the PCIe functions, determining a mapping between the PCIe function and a namespace identified by the NSID based on a data structure stored in a memory address space of the PCIe PF function, and accessing the namespace based on the mapping between the PCIe function and the namespace.

In yet another embodiment, the disclosure includes a method implemented in a computer system comprising dividing a storage capacity of one or more NVM devices into a plurality of namespaces, and allocating a namespace in the plurality of namespaces to at least one PCIe function such that only the allocated namespace is accessible to the at least one PCIe function, wherein the at least one PCIe function belongs to a plurality of PCIe functions present in the computer system comprising a PF and a number of VFs.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 shows an examplary format of an Admin Command Set.

FIG. 6 shows an examplary format of a NVM Command Set.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the examplary designs and implementations illustrated and described herein, but may be modified within the scope of the appended claims along with their full scope of equivalents.

Figure 1:
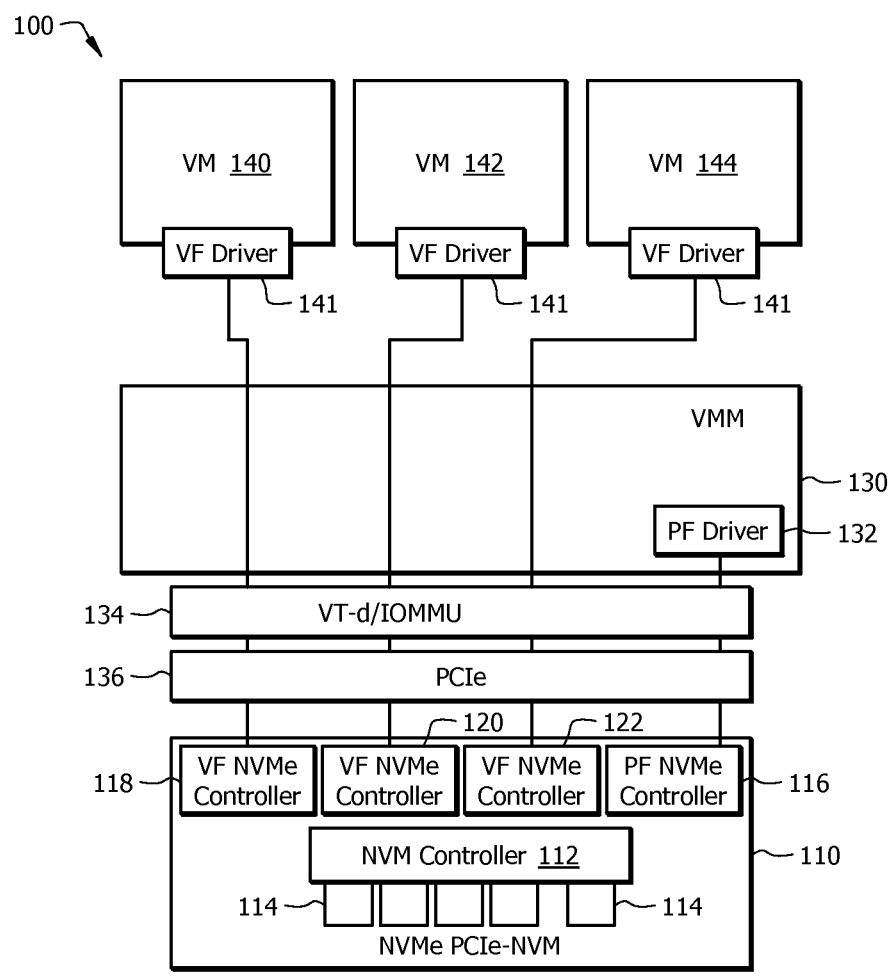
FIG. 1 is an illustrative diagram of an embodiment of a virtualized server system.
Figure 2:
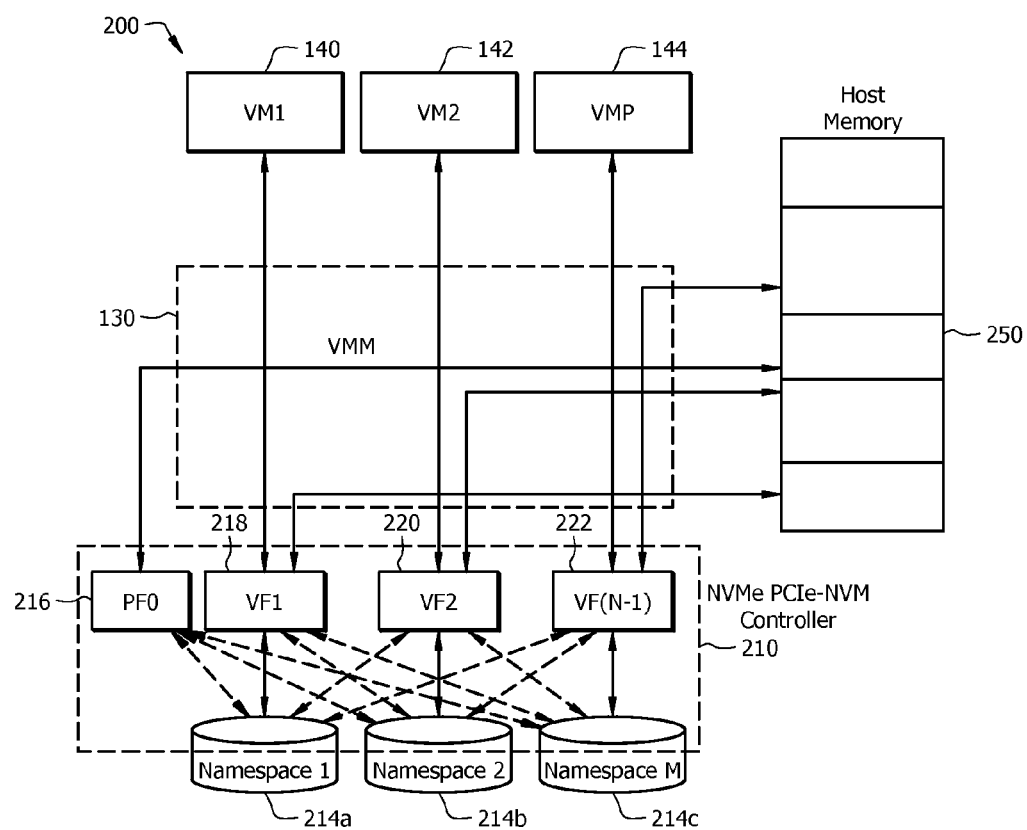
FIG. 2 is an illustrative diagram of another embodiment of a virtualized server system.

FIG. 1 illustrates an embodiment of a virtualized server system 100 with SR-IOV, in which schemes and methods disclosed herein may operate. FIG. 2 illustrates an embodiment of a virtualized server system 200 with SR-IOV, which may be similar to the server system 100 except some implementation details that are described below. Since FIG. 1 and FIG. 2 illustrate interweaving details of a server system from different perspectives, FIG. 1 and FIG. 2 are discussed herein in concert.

Referring to FIG. 1, the system 100 comprises a NVMe PCIe-NVM subsystem 110, which in turn may comprise a NVM controller 112, a number of NVM devices (sometimes referred to in short as NVMs) 114, a physical function (PF) NVMe controller 116, and one or more VF controllers, such as the VF controllers 118, 120, and 122 shown in FIG. 1. Note that a NVMe PCIe-NVM subsystem herein may sometimes be referred to in short as a NVM subsystem. The NVMs 114 may be coupled to the NVM controller 112 via a NVM interface and controlled by the NVM controller 112. Any of the NVMs 114 may be a flash memory, such as negative and (NAND) flash, a phase change memory (PCM), solid state drive (SSD), or any other memory media that may keep data when no power is applied. In addition, the NVM controller 112 may be responsible for various tasks, such as NVM access control, wear-leveling, error detection and correction, mapping and/or translation between virtual addresses (e.g., logic block addresses (LBAs) in namespaces) and physical addresses of memory media devices.

It should be understood that functional scope of certain modules may vary depending on the context. For example, in the NVMe specification, a NVMe controller may encompass functionalities of both a NVMe controller and a NVM controller. In the interest of clarity, a NVMe controller described herein may primarily focus on PCIe configuration functions and NVMe communication interfaces, while a NVM controller described herein may primarily focus on NVM access, control and management functions. One or more NVMe controllers and a NVM controller described herein may be combined to form a NVMe PCIe-NVM controller, such as NVMe PCIe-NVM controller 210 shown in in FIG. 2, NVMe PCIe-NVM controller 310 shown in FIG. 3, NVMe PCIe-NVM controller 710 shown in FIG. 7, and NVMe PCIe-NVM controller 910 shown in FIG. 9. Additionally, some of the notations and terms used herein may sometimes be referred by alternative names elsewhere. For example, for a VMM known as VMware vSphere, SR-IOV may be called raw device mapping (RDM). In any event, a person of ordinary skill in the art should recognize the variety of equivalent notations and/or contexts, and understand that they still fall within the scope of the present disclosure.

In an embodiment, a total usable storage capacity of the NVMs 114 may be divided by the NVM controller 112 into a plurality of namespaces. For example, the usable storage capacity of K NVMs may be divided into M namespaces, wherein K and M are positive integers but not necessarily equal in value. As shown in FIG. 2, M namespaces comprise a namespace 214a (also denoted as namespace 1), a namespace 214b (denoted as namespace 2), and a namespace 214c (denoted as namespace M). Each of the namespaces may represent a slice of storage capacity provided by the NVMs 114 shown in FIG. 1. Note that each namespace may have an equal or unequal storage capacity, which depends on implementation.

As shown in FIG. 1, the PF NVMe controller 116 and the VF controllers 118, 120, and 122 are all NVMe controllers coupled to the NVM controller 112 and configured to control PCIe functions. The VF controllers 118, 120, and 122 may be coordinated or supervised by the PF NVMe controller 116. Note that, A SR-IOV architecture may comprise N PCIe functions including a PF 216 and N−1 VFs, such as VFs 218, 220, and 222, wherein N is an integer greater than one. In FIG. 2, the PF 216 is also denoted as PF0, the VF 218 as VF1, the VF 220 as VF2, and the VF 222 as VF(N−1). Note that it is possible for the server system 100 or 200 to implement multiple SR-IOV architectures, thereby incorporating multiple PFs.

A PCIe function herein may refer to a device or module with access controlled by a PCIe bus. A PCIe function may be identified within a single PCI root complex by its PCIe bus number (denoted as #), device #, and function # (called BDF identification). A PCIe function may include a configuration space, which includes both device dependent and device independent regions used by host software, and memory space, which may be identified by base address registers (BARs) in the configuration space. In the context of PCIe, the PF 216 may be considered a traditional PCIe function that has all of the typical features of a PCIe function including a full PCIe configuration space, an independent set of BARs, transmit descriptors, receive descriptors, and so forth. On the other hand, a VF is a new entity introduced by SR-IOV. A VF may be considered a light-weight and/or low-cost PCIe function containing the basic PCIe configuration space, resources necessary for data movement, and a VF may be subject to certain limitations. The VFs 218, 220, and 222 may be associated with the PF 216 and as such, share the resources of the PF 216. The PF 216 may supervise one or more associated VFs, i.e., VFs 218, 220, and 222. There may be any suitable number of VFs associated with one PF. In some specifications, the number of VFs per PF may be up to 255.

As shown in FIG. 1, the server system 100 may further comprise a plurality of VMs 140, 142, and 144, each of which may act as a guest operational system (OS) running on the server. The number of the VMs may be denoted as P, which is a positive integer. A VMM 130 may be configured to manage the VMs, e.g., by assigning VMs 140, 142, and 144 with hardware and/or software resources and allowing the resources to be accessible to the VMs 140, 142, and 144. The VMM 130 may have a PF driver 132 communicating with the PF NVMe controller 116. In an examplary case, when the VM 140 starts or boots up, it may probe its PCIe configuration space. The VMM 130 may inform the VM 140 of its assigned resources, such as a VF, and location of hardware resources associated with the VF. The VM 140 may have a VF driver 141, which may load up and use transmit descriptors and receive descriptors to tell the VF where to copy data to and from the host memory. Each VM may be assigned with one or more VFs, and there may be dedicated queues and registers for each VF.

In a server system using SR-IOV, there may be several mechanisms for addressing VM data access security issues at different levels. Firstly, a VF may only be accessed by a VM to whom the VF is assigned. Assignment of VF to VM may be controlled by the VMM 130 through host central processing unit (CPU) memory management unit (MMU) mechanism and communications between a VF driver and a PF driver. Secondly, since the host memory 250 may comprise a plurality of address spaces, each allocated to a VM, a VF may only be allowed to access an address space allocated to the VM to whom the VF is assigned. In other words, the VF may not be allowed to access address spaces belonging to other VMs. The host memory 250 (sometimes referred as a system memory) may be implemented as any suitable form of memory allocated and managed by the VMM 130. For example, the host memory 250 may comprise dynamic random access memory (DRAM) or static random access memory (SRAM) devices, where the server holds current programs and data that are in use. Access of VFs to host memory address spaces may be controlled by a MMU 134, which may be implemented as virtualization technology for directed I/O (VT-d) mechanism (if INTEL x86 CPUs are used), or as I/O MMU (IOMMU) mechanism (if AMD x86 CPUs are used). VT-d may refer to a technology provided by INTEL, while IOMMU may refer to a technology provided by AMD.

When processing NVMe traffic using SR-IOV, a PCIe function (either PF or VF) may move data between a VM host memory and a NVMe PCIe-NVM subsystem with direct memory access (DMA) mechanism directly without going through the VMM 130 (although the VMM 130 may need to be present in the server system for configuration and management purposes). For instance, the VM 140 may issue a pointer pointing to a NVMe command stored in a host memory 250. The VM 140 may send the pointer to the VF 218 without going through the VMM 130. The VF 218 may then use the pointer to get the NVMe command from the host memory 250. The NVMe command may comprise a namespace identifier (NSID), which may be used to identify or designate a namespace that the VM 140 wishes to access. The VF 218 may send the NVMe command to the NVM controller 112, e.g., via its corresponding VF NVMe controller 118. The NVM controller 112 may then access (read and/or write) the namespace identified by the NSID contained in the NVMe command. If a result is required by the VM 140, the NVM controller 112 may relay the result back to the VM 140 through the VF 218 but without going through the VMM 130. Thus, it can be seen that data movement between the VM 140 and any of the namespaces 214*a*-214*c* (representing storage capacity of NVM devices) bypasses the VMM 130. Note that bypassing is shown in FIG. 2 using lines between VMs and VFs that cross over the box representing the VMM 130. Consequently, the VMM 130 may not be responsible for preventing the VM 140 from accessing a namespace allocated to another VM.

In a conventional SR-IOV architecture, the lack of VMM supervision may lead to unsecure access of VMs to namespaces (e.g., via VFs). For example, if a VM wishes to access a namespace allocated to another VM, the VM may pick a NSID identifying the unallocated namespace, which may be possible since each of the all namespaces in the system has a unique 32-bit identification (NSID) and a VM could just try some or all NSIDs. Then, the VM may issue a NVMe command (or a pointer to a NVMe command) comprising a NSID identifying the unallocated namespace. Thus, the VM may access via its VF any of the namespaces available in the NVMe PCIe-NVM subsystem, which leads to security issues.

Disclosed herein are apparatuses, systems, and methods for improved data access control in a server system comprising one or more NVMe PCIe-NVM devices with SR-IOV architecture. The disclosed schemes may provide a secure data communication between VMs and namespaces by implementing namespace access control. Specifically, embodiments disclosed herein may realize namespace allocation to PCIe functions (PF and VF), namespace isolation, and namespace sharing among PCIe functions, which may enable NVMe PCIe-NVM product with SR-IOV support. In an embodiment, a VMM may configure a data structure referred to as a shared namespace register (SNSR) by filling a NSID in it during system initialization. A namespace identified by the NSID may be shared by all PCIe functions of a NVMe PCIe-NVM controller present in the server system. Further, the VMM may configure a namespaces access control (NSAC) table to specify mapping between namespaces and PCIe functions. Thus, VM(s) to whom the PCIe functions are assigned may only access allocated namespace(s). A NVMe PCIe-NVM subsystem may use the SNSR, or the NSAC table, or both. During operations, the VMM is bypassed in data movement between VMs and namespaces. Despite the lack of VMM involvement in data movement, the schemes and methods disclosed herein prevent any unsecure access of VMs to namespaces, which is advantageous over conventional SR-IOV architectures.

Figures 3, 4:
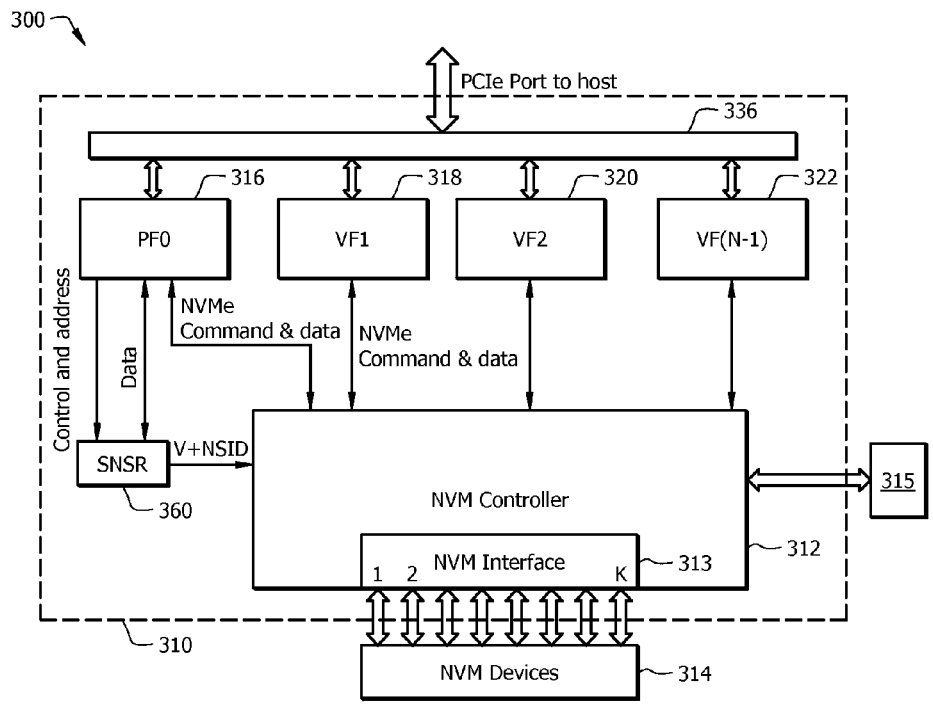
FIG. 3 is a schematic diagram of an embodiment of a NVMe PCIe-NVM subsystem.
FIG. 4 shows an examplary format of a shared namespace register (SNSR).

Refer now to FIG. 3, which illustrates an embodiment of a NVMe PCIe-NVM subsystem 300. The NVM subsystem 300 may be implemented as part of a server system (e.g., the server system 100 in FIG. 1). Thus, some aspects of the NVM subsystem 300 are the same or similar to the NVM subsystem 110. In the interest of conciseness, the following descriptions will focus on aspects not yet described. As shown in FIG. 3, the NVM subsystem 300 may comprise a NVM controller 312 coupled to one or more NVM devices 314 via a NVM interface 313. Recall that there may be K NVM devices 314, which may be external devices (e.g., NAND flash, PCM, and SSD) with respect to a PCIe NVM Controller. The NVM interface 313 may have K channels for connecting K banks of NVM devices 314. The value of K may vary by design (e.g., K=8, 10, or 16). A type of the NVM interface 313 may be asynchronous, open NAND flash interface (ONFI), Toggle, or any other suitable type.

A storage capacity of the K NVM devices 314 may be divided into M namespaces, which serve as storage slices that are initialized, controlled, managed, and accessed by the NVM controller 312 to VMs. Functionalities of the NVM controller may include, but are not limited to, NVM device initiation, read, write, erase, program, wear-leveling, errorcorrecting-coding (ECC), flash-translation-layer (FTL), PCIe interface queue management, and NVMe command execution.

The NVM controller 312 may be further coupled to one or more optional external devices 315, e.g., for data management and/or data buffering. The external devices 315 may comprise SRAM and/or DRAM device(s) for data buffering and/or metadata. Some NVM controllers may have an embedded RAM and other interface(s) for firmware NOR Flash and an electrically erasable programmable ROM (EEPROM) for controller configuration. Note that while the disclosure mainly describes schemes and methods in the context of a NVM controller, these schemes and methods may also apply to other types of controllers, such as NVMe PCIe-NVM RAID controller. A NVMe PCIe-NVM RAID controller may be considered an aggregation of multiple NVMe PCIe-NVM units, which are seen by the host as one NVMe PCIe-NVM unit.

In an embodiment, a register in the NVMe PCIe-NVM subsystem 300, referred to in FIG. 3 as a SNSR 360, may be set up as a dedicated register to allow sharing of a namespace by all PCIe functions, including a PF 316, a VF 318, a VF 320, and a VF 322. The SNSR 360 may reside in a memory address space of the PF 316 and may be configured and managed only via or through the PF 316. As shown in FIG. 3, the SNSR 360 resides in a memory address space coupled to or belonging to the PF 316.

The SNSR 360 may be configured or managed by a VMM (e.g., the VMM 130) through a PCIe interface 336 and the PF 316. The PCIe interface 336 may have a PCIe port connected to the host (e.g., CPU). The PCIe port may be compliant with PCI-SIG (Special Interest Group) PCIe Generation 1/2/3 or newer specifications. Although, the NVMe PCIe-NVM controller may work with more than one physical PCIe port as well. The VMM may have a device driver (e.g., the PF driver 132) for the PF 316.

FIG. 4 shows an examplary format or definition of the SNSR 360, which may comprise 64 bits denote as bit 0, bit 1, ..., and bit 63. Bits 0-31 may be configured to contain a NSID, bits 32-62 may be reserved, and bit 63 may be a validity (V) bit configured to indicate whether the NSID in bits 0-31 is valid. It should be understood that the sizes and/or bit positions of the V bit, reserved bits, and NSID bits may be flexible depending on the implementation. For example, if a NSID is expressed using 16 bits instead of 32 bits, then only 16 bits are needed for the NSID. The reserved bits are for future use, and may be removed if desired.

In an embodiment, the SNSR 360 may be configured by a VMM to allow a namespace to be shared by all PCIe functions. Specifically, the SNSR 360 may be initialized to an invalid status, e.g., upon power on or system reset. Then, the VMM may write in the SNSR 360 by filling in the NSID field (e.g., bits 0-31) a NSID of the namespace to be shared and setting the V bit to a valid value (e.g., Ob1 or binary value 1). Configuration of the SNSR 360 may occur during system initialization, and may update at any other suitable time. When no namespace is to be shared, the VMM may clear the V bit to an invalid value (e.g., Ob0 or binary value 0).

Referring back to FIG. 3, a namespace identified by the NSID in the SNSR 360 may be used by all PCIe functions of the NVMe PCIe-NVM controller 310. For example, when the NVM controller 312 gets a NVMe command, from the PF 316 or any of the VFs 318-322, comprising a first NSID, the NVM controller 312 may compare the first NSID against a second NSID in the SNSR 360 and check the V bit. Since the first and second NSIDs have the same format, they may be directly compared in value. If the first and second NSIDs have different formats, one of the NSIDs may be converted so that comparison may be performed. In any event, if the first and second NSIDs match and the V-bit is valid, the NVM controller 312 may continue executing the NVMe command. Otherwise, the NVM controller 312 may check a NSAC table, which will be described later. Further, although only one SNSR is illustrated in FIG. 3, it should be understood that multiple SNSRs each associated with a unique NSID may be established in the NVM subsystem 300 to allow sharing of multiple namespaces among all PCIe functions of the NVMe PCIe-NVM controller 310.

There are various types of NVMe commands used in the NVMe specification. FIG. 5 illustrates an examplary format of an Admin Command Set, and FIG. 6 illustrates an examplary format of a NVM Command Set, both of which specify formats for NVMe commands. FIG. 5 and FIG. 6 are listed as FIG. 11 and FIG. 12, respectively, in the NVMe Specification Revision 1.1, which is dated Oct. 11, 2012 and incorporated herein by reference. A person of ordinary skill in the art will know the interpretation of the formats. Note that the NVMe commands used herein may not be limited to these formats, rather, any format may be used as long as the principles disclosed herein are conveyed. Note that in FIG. 5 and FIG. 6, PRP denotes physical region page.

The smallest addressable data unit for NVMe read and write commands may be referred to as a logic block identified by a logic block address (LBA). A logic block may contain, but is not limited to, 512 bytes of data, which is the size of a sector in legacy hard disk drives. A namespace comprises a collection of logic blocks with consecutive LBAs, e.g., from 0 to Q−1, where Q is an integer denoting a number of logic blocks in a namespace. Each namespace may have a 32-bit NSID, which is used by a host and a controller as a handle to specify a particular namespace in a NVMe command. In addition to the NSID, each namespace may be assigned a 64-bit globally unique identifier (ID) in the format of an Institute of Electrical and Electronics Engineers (IEEE) extended unique identifier (EUI64). Recall that a NVM subsystem may comprise one or more namespaces. If multiple namespaces are present, a total storage capacity of the NVM subsystem may equal a summation of the storage capacity of all the namespaces.

For NVMe commands which need to specify a namespace, the namespace may be identified or designated in a 32-bit NSID field in DWORD1. Further, a starting LBA of a logic block may be identified in a 64-bit SLBA field in DWORD10 and DWORD11, and a number of logic blocks to be accessed may be identified in a 16-bit NLB field in DWORD12. If desired, any other field may be used to indicate the information as well.

Figures 7, 8:
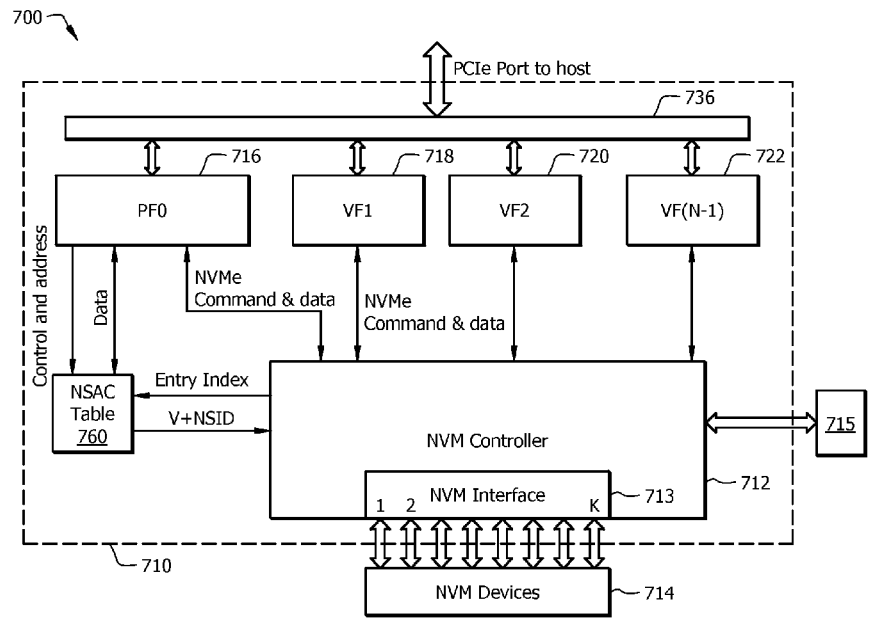
FIG. 7 is a schematic diagram of another embodiment of a NVMe PCIe-NVM subsystem.
FIG. 8 shows an examplary format of a namespace access control (NSAC) table.

Refer now to FIG. 7, which illustrates an embodiment of a NVMe PCIe-NVM subsystem 700. A person of ordinary skill in the art will recognize that some aspects of the NVMe PCIe-NVM subsystem 700 are the same with or similar to the NVMe PCIe-NVM subsystem 300, thus in the interest of conciseness the following descriptions will focus on aspects that are different. As shown in FIG. 7, the NVMe PCIe-NVM subsystem 700 may comprise a NVM controller 712 coupled to one or more NVM devices 714 via a NVM interface 713. The NVM controller 712 may be further coupled to one or more optional external devices 715. The NVMe PCIe-NVM subsystem 700 may further comprise PCIe functions, including a PF 716, a VF 718, a VF 720, and a VF 722, communicating with a VMM and VMs via a PCIe interface 736.

Instead of using the SNSR 360, which enables sharing of a namespace by all PCIe functions of a NVMe PCIe-NVM controller 710, the NVM subsystem 700 uses a NSAC table 760 to enable mapping between certain PCIe function(s) and certain namespace(s). The NSAC table 760 may enable namespace isolation among all VFs and/or namespace sharing among some VFs. Thus, namespace(s) may only be accessed by a specific VF to which the namespace is allocated, and thereby accessed by a specific VM to which the VF is assigned. The NSAC table 760 may reside in a memory address space assigned to the PF 716 in the NVMe PCIe-NVM controller 710. As shown in FIG. 7, the NSAC table 760 resides in a memory address space coupled to or belonging to the PF 716.

FIG. 8 shows an examplary format or definition of the NSAC table 760, which may comprise N entries, where N is the number of PCIe functions of the NVMe PCIe-NVM controller 710. Each entry may have an entry index, and the entry index may be generated by the NVM controller 712 in a way such that each entry index corresponds to a PCIe function number. For example, PF with function #0 may correspond to entry index 0 (i.e., first entry), VF1 with function #1 may correspond to entry index 1 (i.e., second entry), . . . , and VF(N−1) with function # (N−1) may correspond to entry index (N−1) (i.e., N-th entry). Note that per SR-IOV specification, the PCIe function numbers for the VFs of a PF, and the PCIe function numbers of the PF and the first VF, may not necessarily be consecutive, if viewed externally from the PCIe interface. Inside a NVMe PCIe-NVM controller, the PF may not necessarily start from a PCIe function number of 0. There is always a mapping between the PCIe function number and the NSAC table index, thus each PCIe function (PF or VFs) of the NVMe PCIe-NVM controller corresponds to a NSAC table entry. Other indexing schemes may be used within the scope of the present disclosure. Each entry is shown as a row in FIG. 8, but it can be configured as a column or any other structure.

Each entry of the NSAC table 760 may comprise 64 bits denote as bit 0, bit 1, . . . , and bit 63. Bits 0-31 may be configured to contain a NSID, bits 32-62 may be reserved, and bit 63 may be a V bit configured to indicate whether the NSID in bits 0-31 is valid. Further, each entry may be addressable via a memory address in the PF memory address space starting from a base address denoted as NSAC_BASE_ADD, which is determined by one of PF's BARS for the VMM to configure and manage the NSAC table. Entry 0 may be addressable using NSAC_BASE_ADD, Entry 1 may be addressable using an address denoted as NSAC_BASE_ADD+1×8 (8 bytes=64 bits), . . . , and Entry (N−1) may be addressable using an address denoted as NSAC_BASE_ADD+(N−1)×8. It should be understood that the sizes and/or bit positions of the V bit, reserved bits, and NSID bits may be flexible depending on the implementation. For example, if a NSID is expressed using 16 bits instead of 32 bits, then only 16 bits are needed for the NSID. The reserved bits are for future use, and may be removed if desired.

In an embodiment, the NSAC table 760 may be both read and written by a VMM, but read only by a NVM controller. Specifically, all entries of the NSAC table 760 may be initialized to an invalid status, e.g., upon power on or system reset. Upon starting a VM and before the VM is started, the VMM may allocate a namespace to a PCIe function (thus a VM) by configuring a table entry corresponding to the PCIe function. Suppose that a namespace m (an integer between 1 and M) is to be allocated to VF1, with the presumption that any other PCIe function can work similarly. The VMM may write in Entry 1 of the NSAC table 760 by filling Entry 1 with a NSID corresponding to namespace m and setting its V bit to a valid value (e.g., 0b1 or binary value 1).

Note that two or more PCIe functions of the NVMe PCIe-NVM controller 710 may share one namespace. For example, the namespace m can be allocated to a second PCIe function VF2 in addition to VF1. Specifically, the VMM may write in Entry 2 of the NSAC table 760 by filling Entry 2 with the NSID corresponding to namespace m and setting its V bit to a valid value. Moreover, it is possible for two or more namespaces to be allocated to one VM, which is assigned with multiple VFs. For example, a second namespace m' (an integer between 1 and M, and m≠m') can be allocated to a second VF of the VM. It is further possible that some namespaces are allocated to one PCIe function, while some other namespaces are shared among other PCIe functions. After configuring the NSAC table 760, the VMM may start a VM to whom a VF is assigned. During operation, the VM may access the namespace(s) through the VF(s), as described in the following paragraph. When the VM is shut down, a VMM managing the VM may clear a corresponding entry in the NSAC table 760 to an invalid state (e.g., V bit set to 0b0).

Referring back to FIG. 7, a namespace identified by a NSID in an entry of the NSAC table 760 may be used by its corresponding PCIe function to process PCIe-NVM storage traffic. For example, after the NVM controller 712 gets or obtains a NVMe command from an I/O submission queue in the host memory through a VF or a PF, the NVM controller 712 may internally generate a NSAC table entry index based on the VF or PF from which the NVMe command came. The NVM controller 712 may then read the NSAC table 760 by using the generated NSAC table entry index to look up an entry of the NSAC table 760 corresponding to the NSAC table entry index. If the V bit is invalid (e.g., 0b0), then no namespace has been assigned to this PCIe function, in which case the NVMe command may be aborted. Otherwise, if the V bit is 0b1, the NVM controller 712 may further check if a first NSID contained in the NVMe command is the same as a second NSID in the indexed entry. If the first and second NSIDs match, the NVM controller 712 may continue executing the NVMe command. Otherwise, the NVM controller may abort the NVMe command. Although only one NSAC table is illustrated in FIG. 7, it should be understood that multiple NSAC tables may be used if desired.

Figure 9:
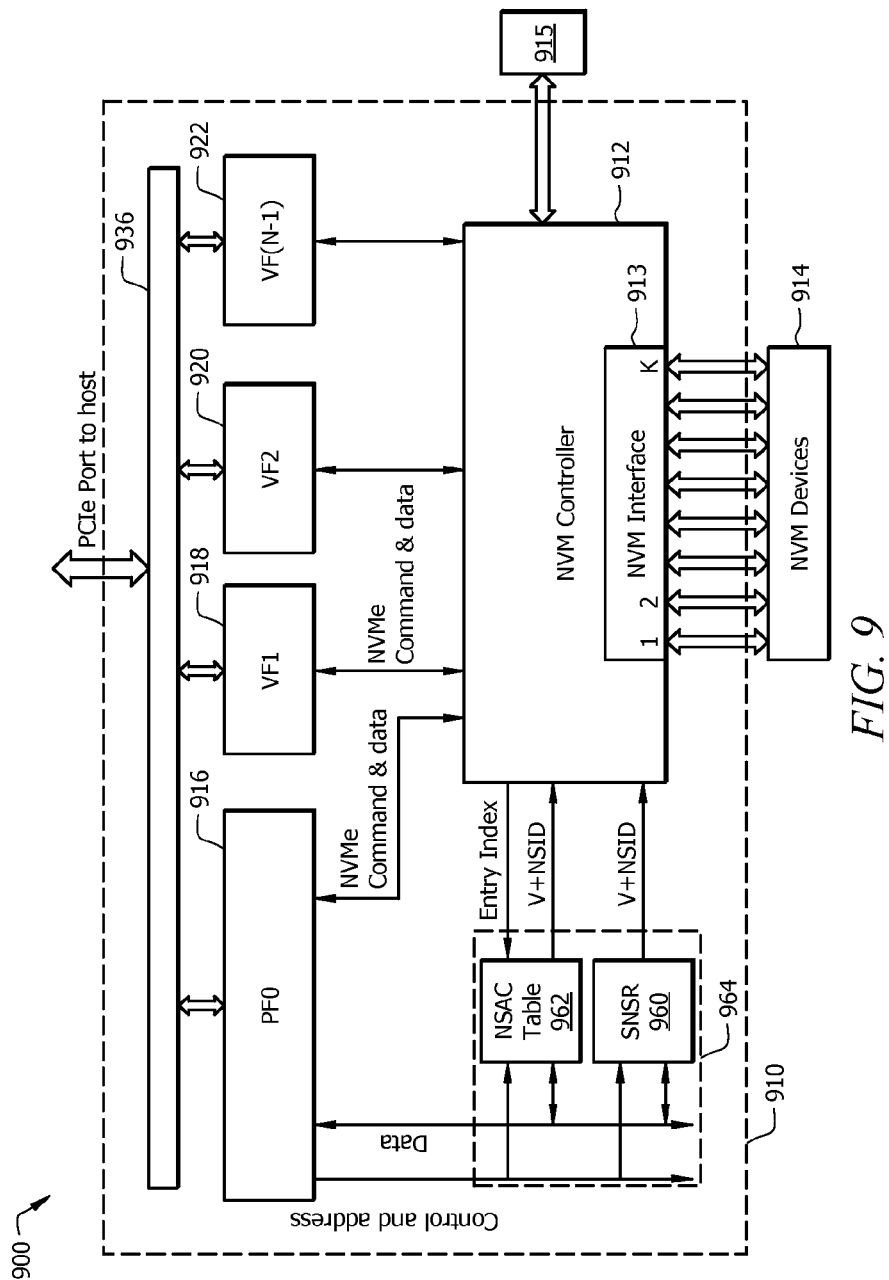
FIG. 9 is a schematic diagram of yet another embodiment of a NVMe PCIe-NVM subsystem.

Refer now to FIG. 9, which illustrates an embodiment of a NVMe PCIe-NVM subsystem 900, which utilizes both a SNSR 960 and a NSAC table 962. Note that some aspects of the NVM subsystem 900 are the same with or similar to the NVMe PCIe-NVM subsystems 300 and 700, thus in the interest of conciseness the following descriptions will focus on aspects that are different. As shown in FIG. 9, the NVM subsystem 900 may comprise a NVM controller 912 coupled to one or more NVM devices 914 via a NVM interface 913. The NVM controller 912 may be further coupled to one or more optional external devices 915. The NVM subsystem 900 may further comprise PCIe functions, including a PF 916, a VF 918, a VF 920, and a VF 922, communicating with a VMM and VMs via a PCIe interface 936.

By using both the SNSR 960 and the NSAC table 962, the NVM subsystem 900 may share a namespace (identified by a NSID in the SNSR 960) among all PCIe function, while isolating other namespace(s) (identified by a NSID(s) in the NSAC table 962) among some PCIe functions. The SNSR 960 and the NSAC table 962 may reside in a PCIe memory address space assigned to the PF 916 of a NVMe PCIe-NVM controller 910. As shown in FIG. 9, the SNSR 960 and the NSAC table 962 reside in a memory address space 964 coupled to or belonging to the PF 916. Configuration and use of the SNSR 960 and the NSAC table 962 may be similar to SNSR 360 and the NSAC table 760 respectively.

It should be understood that a SNSR and/or a NSAC table disclosed herein may be implemented as data structure(s) taking any suitable form, as long as required information can be obtained from the data structure(s). For example, instead of using SNSR and NSAC table as described above, other schemes and algorithms may be used to provide functions similar to the combination of the SNSR and NSAC table.

Figure 10:
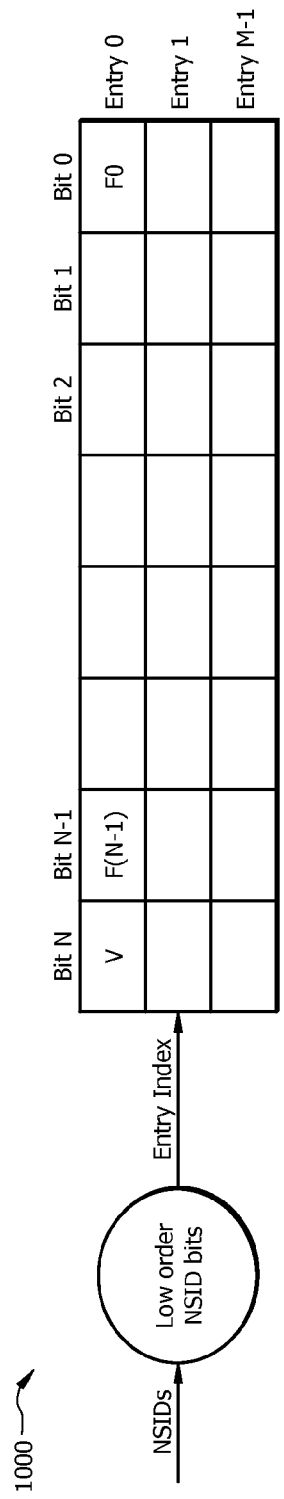
FIG. 10 shows another examplary format of a NSAC table.

FIG. 10 shows an examplary format of a NSAC table 1000, which may comprise M entries, where M is the number of namespaces. A NSAC table entry index may be generated directly based on NSIDs, thus the NSAC table 1000 may be alternatively referred to as a Direct-NSID-NSAC. In an embodiment, the NSAC table index may be formed using some low order bits of NSIDs. As NSIDs may be relatively long (e.g., 32 bits), using part of the bits may help reduce the size of the NSAC table 1000. Of course, if table size is not a concern, the NSAC table 1000 may directly use NSIDs as its entry index. Further, each entry may comprise N+1 bits: N bits for N PCIe functions (PF and its VFs, denoted as F0 to F(N−1)) and one V bit to indicate the entry is valid. In the N PCIe function bits, one bit is designed for each PCIe function to define if the PCIe function has access to a namespace corresponding to a NSID of this entry. If all of the N PCIe function bits are valid, the namespace is shared by all the PCIe functions. If only one of the N PCIe function bits is valid, the namespace is allocated to only one PCIe function. If some of the N PCIe function bits are valid, the namespace is shared by these PCIe functions, If none of the N PCIe function bits is valid, the namespace is allocated to no PCIe function. Recall that a PCIe function is owned by one VM, thus a namespace allocated to one PCIe function means this namespace is allocated to or owned by the VM to whom the PCIe function is assigned. A namespace shared by some or all PCIe functions means this namespace is shared by the VMs to whom the PCIe functions are assigned.

In case of the Direct-NSID-NSAC, when a NVM controller gets a NVMe command from the host memory via a PCIe function, the NVM controller may use the low order bits of the NSID as an entry index to locate an entry in the Direct-NSID-NSAC table. Further, the NVM controller may generate a function index (denoted as Fn) of the PCIe function to locate a specific bit in the indexed entry. The NVM controller may check the V bit and a bit for Fn. If both the V bit and a bit for Fn are valid (e.g., 0b1), the NVM controller may execute the command as normal. Otherwise, the NVM controller may abort the command.

Figure 11:
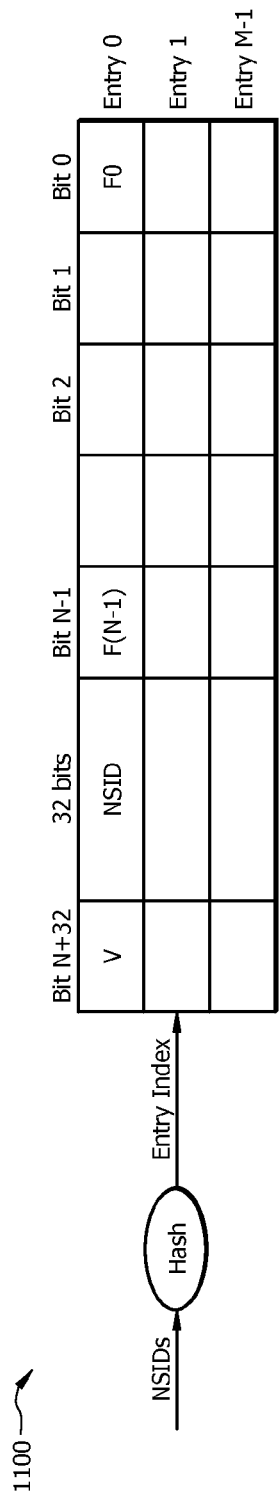
FIG. 11 shows yet another examplary format of a NSAC table.

FIG. 11 shows another examplary format of a NSAC table 1100, which may be similar to the NSAC table 1000 but indexed differently. NSAC table entry index may be based on a hash algorithm of NSIDs, thus the NSAC table 1100 may be alternatively referred to as a Hash-NSID-NSAC. As NSIDs may be relatively long (e.g., 32 bits), using a hash function of NSIDs may help reduce the size of the NSAC table 1100. Further, each entry in the NSAC table 1100 may comprise N+33 bits: N bits for N PCIe functions (PF and its VFs, one bit for each PCIe function to define if the PCIe function has access to a namespace corresponding to a NSID of this entry), one V bit to indicate the entry is valid, and 32 bits as a NSID field to contain a NSID. The NSID may be compared by a NVM controller against the 32-bit NSID contained in a NVMe commands during namespace access control to ensure that the entry does have the exact same NSID as contained the NVMe command.

In case of the Hash-NSID-NSAC, when a NVM controller gets a NVMe command via a PCIe function, the NVM controller may employ a hash algorithm on the 32-bit NSID in the NVMe command to generate a table entry index. The table entry index may then be used to look up an entry in the Hash-NSID-NSAC table. Further, the NVM controller may generate a function index (denoted as Fn) of the PCIe function to locate a specific bit in the indexed entry. The NVM controller may check the V bit, a bit for Fn, and the NSID field. If the V bit and a bit for Fn are valid (e.g., 0b1), and the NSID in the NVMe command matches with the NSID field of the entry, the NVM controller may execute the command as normal. Otherwise, the NVM controller may abort the command. Further, to resolve potential entry conflict due to hash algorithm, it is possible that each hashed index may correspond to multiple entries, although this approach may increase design complexity.

Either the Direct-NSID-NSAC or the Hash-NSID-NSAC may be configured (read and written) by a VMM through a PF, and read only by a NVM controller. The VMM may use the same algorithm as the NVM controller to generate a table entry address to locate entries in the NSAC table. Based on descriptions above, a person of ordinary skill in the art will recognize how to implement the Direct-NSID-NSAC or the Hash-NSID-NSAC in a NVM subsystem.

Figure 12:
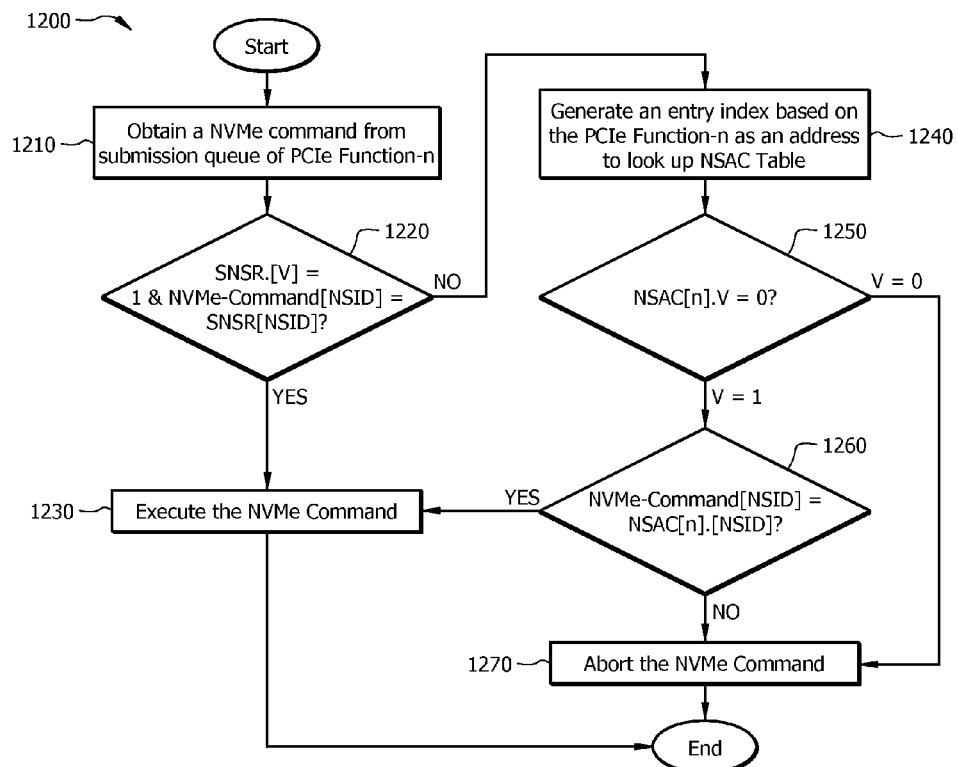
FIG. 12 is a flowchart of an embodiment of a NVMe command handling method.

Refer now to FIG. 12, which illustrates an embodiment of a NVMe command handling method 1200. The method 1200 may be implemented by a NVM subsystem (e.g., the NVM subsystem 110, 300, 700, or 900). The method 1200 assumes the presence of both a SNSR (e.g., the SNSR 360) and a NSAC table (e.g., the NSAC table 800) in the PCIe memory address space of the PF of a NVMe PCIe-NVM controller (e.g., the controller 300, 700, or 900), but it should be understood that other variations (e.g., using only Direct-NSID-NSAC 1000 or Hash-NSID-NSAC 1100) can be implemented similarly. The method 1200 starts from step 1210, in which a NVMe command may be obtained or gotten by the NVM controller from a submission queue of a PCIe function (denoted as Function-n) in FIG. 12, which may be a PF or VF. From the perspective of a NVM controller, the NVM controller may get the NVMe command via the PCIe function. The NVMe command comprises a first NSID (denoted as NVMe-Command[NSID]) identifying a namespace the PCIe function wishes to access. In step 1220, the method 1200 may determine whether the validity bit of a SNSR (denoted as SNSR.[V]) has a valid value and whether a second NSID in the SNSR (denoted as SNSR[NSID]) matches the first NSID. Determination of the validity bit and the NSID matching should be performed after reading the SNSR and obtaining the validity bits and the second NSID. Note that sometimes the validity bit may not be present thus no need to be checked. If the condition in step 1220 is met, it confirms that a shared namespace identified by SNSR[NSID] is to be accessed. In this case, the method may proceed to step 1230, where the NVMe command is executed, allowing the NVM controller to access the namespace identified by SNSR[NSID]. Note that SNSR is configured by a VMM during NVMe PCIe-NVM subsystem initialization. Otherwise, if the condition in step 1220 is not met, the method 1200 may proceed to step 1240.

In step 1240, the NVM controller may generate an entry index based on the PCIe function, through which the NVM controller gets the NVMe command. The entry index may be used as an address or index to the NSAC table to locate or look up one of a plurality of entries in the NSAC table. In step 1250, the NVM controller may check a validity bit of the located entry (denoted as NSAC[n].V) to determine whether the validity bit has a valid value. For simplicity, V=1 may indicate a valid value, while V=0 may indicate an invalid value. If NSAC[n].V has a valid value, the method 1200 may proceed to step 1260; otherwise, the method 1200 may proceed to step 1270, where the NVMe command comprising the first NSID may be aborted or discarded.

In step 1260, the method 1200 may determine whether a third NSID contained in the NSAC table (denoted as NSAC[n].[NSID]) matches the first NSID (carried in the NVMe command). Note that determination of the validity bit in step 1250 and the NSID matching in step 1260 should be performed after reading the NSAC table and obtaining the validity bits and the third NSID. Note that sometimes the validity bit in the NSAC table may not be present thus no need to be checked. If the condition in step 1260 is met, it confirms that there is a mapping between the PCIe function (thus its corresponding VM) and a namespace identified by NSAC[n].[NSID]. In this case, the method may proceed to step 1230; otherwise, the method 1200 may proceed to step 1270.

As shown in FIG. 12, steps 1220, 1240, 1250, and 1260 may be considered as a procedure performed by the NVM controller to determine a mapping between the PCIe function and a namespace identified by the NSID (contained in the NVMe command, which is gotten via the PCIe function). Recall that a given namespace may be accessible to one or more PCIe functions, and a given PCIe function may be allocated with one or more namespaces, thus the mapping between the two may not necessarily be a one-to-one mapping.

It should be understood by a person of ordinary skill in the art that some variations of the method 1200 are allowable and fall into the scope of the present disclosure. For example, instead of using a separate SNSR and a NSAC table, any number and/or any type of data structure may be used to contain similar information. For another example, an entry index of the data structure or data structures may be generated from the PCIe function number, low order bits of the NSID contained in the NVMe command, or hash function of the NSID contained in the NVMe command, or in combination with any other appropriate value. For yet another example, determining the mapping between the PCIe function and namespace may not directly match NSID values; instead, binary bits corresponding to each PCIe function may be used to indicate whether a namespace has been allocated to a given PCIe function.

All NMVe specifications up to Revision 1.1 may not contain the disclosed schemes, such as mapping namespaces to VFs, the sharing of namespaces among VFs, and isolation of namespaces among VFs. Rather, the NVMe Specification Revision 1.1 states, in Section 8.5, that "All other aspects associated with SR-IOV such as the architecture of the PF, mapping of namespaces to VFs, and sharing of namespaces between VFs are outside the scope of this specification."

Figure 13:
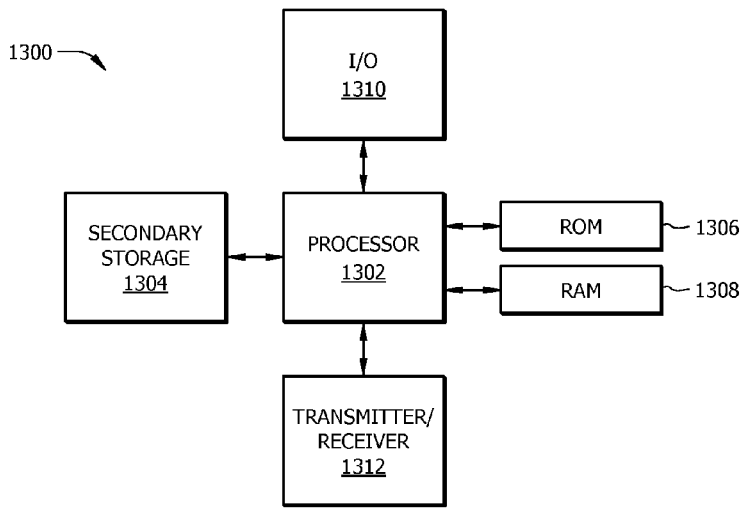
FIG. 13 is a schematic diagram of an embodiment of a computer system.

The schemes described above may be implemented on a network component, such as a computer or network component with sufficient processing power, memory resources, and network throughput capability to handle the necessary workload placed upon it. FIG. 13 illustrates an embodiment of a network component or computer system 1300 suitable for implementing one or more embodiments of the methods disclosed herein, such as the NVMe command handling method 1200. Further, components in the computer system 1300 may be configured to implement any of the apparatuses described herein, such as the server system 100, the server system 200, the NVM subsystem 300, the SNSR 360, the NVM subsystem 700, the NSAC table 760, the NVM subsystem 900, the NSAC table 1000, the NSAC table 1100.

The computer system 1300 includes a processor 1302 that is in communication with memory devices including secondary storage 1304, read only memory (ROM) 1306, random access memory (RAM) 1308, input/output (I/O) devices 1310, and transmitter/receiver 1312. Although illustrated as a single processor, the processor 1302 is not so limited and may comprise multiple processors. The processor 1302 may be implemented as one or more central processor unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 1302 may be configured to implement any of the schemes described herein, including the method 1200. The processor 1302 may be implemented using hardware or a combination of hardware and software.

The secondary storage 1304 is typically comprised of one or more disk drives or tape drives and is used for non-volatile storage of data and as an over-flow data storage device if the RAM 1308 is not large enough to hold all working data. The secondary storage 1304 may be one or more flash memories (e.g., NAND flash), PCMs, SSDs, or any other NVMs, or combinations thereof. The secondary storage 1304 may be used to store programs that are loaded into the RAM 1308 when such programs are selected for execution. The ROM 1306 is used to store instructions and perhaps data that are read during program execution. The ROM 1306 is a non-volatile memory device that typically has a small storage capacity relative to the larger storage capacity of the secondary storage 1304. The RAM 1308 is used to store volatile data and perhaps to store instructions. Access to both the ROM 1306 and the RAM 1308 is typically faster than to the secondary storage 1304.

The transmitter/receiver 1312 may serve as an output and/or input device of the computer system 1300. For example, if the transmitter/receiver 1312 is acting as a transmitter, it may transmit data out of the computer system 1300. If the transmitter/receiver 1312 is acting as a receiver, it may receive data into the computer system 1300. The transmitter/receiver 1312 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The transmitter/receiver 1312 may enable the processor 1302 to communicate with an Internet or one or more intranets. I/O devices 1310 may include a video monitor, liquid crystal display (LCD), touch screen display, or other type of display. I/O devices 1310 may also include one or more keyboards, mice, or track balls, or other well-known input devices.

It is understood that by programming and/or loading executable instructions onto the computer system 1300, at least one of the processor 1302, the secondary storage 1304, the RAM 1308, and the ROM 1306 are changed, transforming the computer system 1300 in part into a particular machine or apparatus (e.g., a server system having the novel functionality taught by the present disclosure). The executable instructions may be stored on the secondary storage 1304, the ROM 1306, and/or the RAM 1308 and loaded into the processor 1302 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means+/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

I claim:

1. A method implemented by a non-volatile memory (NVM) controller comprising:
   obtaining a NVM express (NVMe) command comprising a namespace identifier (NSID) from a host memory via a peripheral component interconnect express (PCIe) function;
   determining a mapping between the PCIe function and a namespace identified by the NSID based on a data structure stored in a PCIe memory address space; and
   accessing the namespace based on the mapping between the PCIe function and the namespace.

2. The method of claim 1, wherein the NSID is a first NSID, and wherein determining the mapping between the PCIe function and the namespace comprises:
   obtaining a second NSID by reading the data structure; and
   determining a match between the first and second NSIDs.

3. The method of claim 2, wherein the PCIe function is one of a plurality of PCIe functions coupled to the NVM controller and comprising a physical function (PF) and a number of virtual functions (VFs), wherein the data structure is a shared namespace register (SNSR) comprising the second NSID, and wherein a second namespace identified by the second NSID is sharable by all of the PCIe functions through the NVM controller.

4. The method of claim 3, wherein the SNSR further comprises a validity bit, wherein determining the mapping between the PCIe function and the namespace further comprises checking the validity bit.

5. The method of claim 3, wherein determining the mapping between the PCIe function and the namespace further comprises, upon failure of determining the match between the first and second NSIDs:
   generating an entry index based on the PCIe function;
   locating an entry among a plurality of entries in a namespaces access control (NSAC) table based on the generated entry index;
   obtaining a third NSID from the located entry; and
   determining a match between the first and third NSIDs.

6. The method of claim 5, further comprising initializing and configuring the SNSR and the NSAC table using a virtual machine manager (VMM) before executing any NVMe command from a corresponding PCIe function, wherein the SNSR and NSAC table are readable by the NVM controller but not configurable by the NVM controller.

7. The method of claim 2, wherein the data structure comprises a plurality of entries, wherein determining the mapping between the PCIe function and the namespace further comprises:

generating an entry index based on the PCIe function; and
locating an entry among the plurality of entries using the generated entry index as an address to the data structure, and wherein the second NSID is obtained from the located entry.

8. The method of claim 7, wherein the located entry comprises a validity bit, wherein determining the mapping between the PCIe function and the namespace further comprises checking the validity bit.

9. The method of claim 7, wherein the PCIe function is one of a plurality of PCIe functions coupled to the NVM controller and comprising a physical function (PF) and a number of virtual functions (VFs), and wherein the memory address space belongs to the PF.

10. The method of claim 2, wherein the data structure comprises a plurality of entries, wherein determining the mapping between the PCIe function and the namespace further comprises, prior to obtaining the second NSID:
generating an entry index by computing a hash function of the first NSID; and
locating an entry among the plurality of entries using the generated entry index as an address to the data structure, and wherein the second NSID is obtained from the located entry.

11. The method of claim 10, wherein determining the mapping between the PCIe function and the namespace further comprises:
generating a PCIe function number based on the PCIe function;
locating a bit in the located entry using the generated PCIe function number; and
determining validity of the bit,
and wherein accessing the namespace identified by the second NSID occurs only when the bit is determined to be valid.

12. The method of claim 1, wherein the data structure comprises a plurality of entries, wherein determining the mapping between the PCIe function and the namespace comprises:
locating an entry among the plurality of entries using low order bits of the NSID as an index of the data structure;
checking a validity bit of the located entry;
generating a PCIe function number based on the PCIe function;
locating a bit in the located entry using the generated PCIe function number; and
determining validity of the bit,
and wherein accessing the namespace occurs only when the bit is determined to be valid and the validity bit of the located entry is valid.

13. An apparatus comprising:
one or more non-volatile memory (NVM) devices having a total storage capacity represented by a plurality of namespaces;
a NVM express (NVMe) peripheral component interconnect express (PCIe)-NVM (NVMe PCIe-NVM) controller coupled to the NVM devices; and
a plurality of PCIe functions including a physical function (PF) and a number of virtual functions (VF) coupled to the NVMe PCIe-NVM controller,
wherein the NVMe PCIe-NVM controller is configured to:
getting a NVM express (NVMe) command comprising a namespace identifier (NSID) from a host memory via a PCIe function of the PCIe functions;
determining a mapping between the PCIe function and a namespace identified by the NSID based on a data structure stored in a memory address space of the PF; and
accessing the namespace based on the mapping between the PCIe function and the namespace.

14. The apparatus of claim 13, further comprising:
a plurality of virtual machines (VMs); and
a VM manager (VMM) configured to, prior to the NVMe PCIe-NVM controller getting the NVMe command:
assign a VF in the number of VFs to one of the VMs; and
configure the data structure to establish the mapping between the PCIe function and the namespace,
wherein the data structure is readable by the NVMe PCIe-NVM controller but not configurable by the NVMe PCIe-NVM controller.

15. The apparatus of claim 13, wherein the NSID is a first NSID, wherein the data structure is a shared namespace register (SNSR) comprising a second NSID, wherein a second namespace identified by the second NSID is sharable by all of the PCIe functions through the NVMe PCIe-NVM controller, and wherein determining the mapping between the PCIe function and the namespace comprises determining a match between the first and second NSIDs.

16. The apparatus of claim 13, wherein the data structure comprises a plurality of entries, wherein determining the mapping between the PCIe function and the namespace further comprises:
generating an entry index based on the PCIe function;
locating an entry among the plurality of entries using the generated entry index as an address to the data structure;
obtaining a second NSID from the located entry; and
determining a match between the first and second NSIDs.

17. A method implemented in a computer system comprising:
dividing a storage capacity of one or more non-volatile memory (NVM) devices into a plurality of namespaces; and
allocating a namespace in the plurality of namespaces to at least one peripheral component interconnect express (PCIe) function such that only the allocated namespace is accessible to the at least one PCIe function, wherein the at least one PCIe function belongs to a plurality of PCIe functions present in the computer system comprising a physical function (PF) and a number of virtual functions (VFs).

18. The method of claim 17, further comprising:
assigning the at least one PCIe function to one or more virtual machines (VMs) using a VM manager (VMM); and
communicating data between the VMs and the allocated namespace through the at least one PCIe function and bypassing the VMM.

19. The method of claim 18, wherein allocating the namespace comprises configuring a shared namespace register (SNSR), or a namespaces access control (NSAC) table, or both, using the VMM.

20. The method of claim 19, wherein communicating data between the VMs and the allocated namespace comprises:
getting a NVM express (NVMe) command comprising a namespace identifier (NSID) via one of the PCIe functions by a NVM controller coupled to the PCIe function;
determining a mapping between the PCIe function and the namespace identified by the NSID based on allocation of the namespace; and
executing the NVMe command to access the namespace based on the mapping.

* * * * *